United States Patent [19]
Biegelsen et al.

[11] Patent Number: 5,897,097
[45] Date of Patent: Apr. 27, 1999

[54] PASSIVELY ADDRESSABLE FLUID VALVES HAVING S-SHAPED BLOCKING FILMS

[75] Inventors: David K. Biegelsen, Portola Valley; Patrick C. P. Cheung, Oakland; Andrew A. Berlin, Palo Alto; Warren B. Jackson, San Francisco; Lars-Erik Swartz, Sunnyvale; Raj B. Apte, Palo Alto; Richard H. Bruce, Los Altos, all of Calif.

[73] Assignee: Xerox Corporation, Stamford

[21] Appl. No.: 08/711,299

[22] Filed: Sep. 6, 1996

[51] Int. Cl.⁶ .................................................. F16K 31/02
[52] U.S. Cl. ............................... 251/129.01; 251/129.06; 251/901; 137/597
[58] Field of Search ..................... 251/129.01, 129.06, 251/901; 137/597

[56] References Cited

U.S. PATENT DOCUMENTS

| | | |
|---|---|---|
| 3,243,181 | 3/1966 | Lyman . |
| 3,405,977 | 10/1968 | Albright . |
| 3,414,331 | 12/1968 | Fogg . |
| 3,422,411 | 1/1969 | Smith, Jr. . |
| 3,437,335 | 4/1969 | Gluskin . |
| 3,550,964 | 12/1970 | Spyropoulos . |
| 3,918,706 | 11/1975 | Craft . |
| 4,493,548 | 1/1985 | Ateya . |
| 4,577,854 | 3/1986 | Bachman et al. . |
| 4,581,624 | 4/1986 | O'Connor ..................... 251/129.01 |
| 4,618,292 | 10/1986 | Judge et al. . |
| 4,874,273 | 10/1989 | Tokisue et al. . |
| 5,284,179 | 2/1994 | Shikida et al. . |
| 5,452,878 | 9/1995 | Gravesen et al. ............... 251/129.01 X |
| 5,497,987 | 3/1996 | Henn et al. . |
| 5,671,905 | 9/1997 | Hopkins, Jr. ..................... 251/129.01 |

FOREIGN PATENT DOCUMENTS

| | | |
|---|---|---|
| 214554 | 8/1989 | Japan . |
| 243418 | 9/1990 | Japan . |
| 2226538 | 7/1990 | United Kingdom . |
| 2275903 | 9/1994 | United Kingdom . |

OTHER PUBLICATIONS

Konishi, S. et al., A Conveyance System Using Air Flow Based on the Concept of Distributed Micro Motion Systems. Journal of Microelectromechanical Systems, vol. 3, No. 2, Jun. 1994, pp. 54–58.

Konishi, S. et al., System Design for Cooperative Control of Arrayed Microactuators. Proceedings of the IEEE Micro Electro Mechanical Systems 1995, IEEE, Piscataway, NJ, USA 95CH35754, pp. 322–327.

Paivanas, J.A. et al., Air Film System for Handling Semiconductor Wafers. IBM J. Res. Develop., vol. 23, No. 4, Jul. 1979, pp. 361–375.

*Primary Examiner*—Kevin Lee
*Attorney, Agent, or Firm*—Robert A. Burtzlaff

[57] ABSTRACT

A bistable valve useful for paper handling applications is disclosed. The valve can be batch fabricated in two dimensional valve arrays, with each valve in the array being controlled by passive matrix addressing. Typically, each valve includes a valve housing having an aperture plate defining an aperture therethrough, and an opposing plate positioned in spaced apart relationship to the aperture plate. A flexible film or strip is attached at its first end to the aperture plate and at its second end to the opposing plate. Valve action is provided by use of at least two switching electrodes for moving the flexible film between an aperture blocking position and an aperture open position, with at least one of the switching electrodes positioned adjacent to the aperture plate and at least one of the switching electrodes positioned adjacent to the opposing plate. To reduce unswitched movement when the switching electrode bias is reduced or not present, at least two electrostatic or mechanical catches are used.

16 Claims, 7 Drawing Sheets

FIG. 11

PASSIVELY ADDRESSABLE FLUID VALVES HAVING S-SHAPED BLOCKING FILMS

FIELD OF THE INVENTION

The present invention relates to electronically addressable bistable valves suitable for controlling fluid flow. More specifically, the present invention relates to a passively addressable array of valves for controlling air jet operation, with particular utility for paper handling applications.

BACKGROUND AND SUMMARY OF THE INVENTION

High speed electronic control of fluid flow using inexpensive batch fabricated valve arrays is potentially critical for numerous applications, including distributed actuator controls, paper or object positioning, dynamic control of fluid instabilities, or microcontrol of microchemical reactions and biological assays. Other potential applications include use of valves to drive physical elements that support tactile displays or other virtual reality interface tools. However, large two dimensional arrays of microvalves (e.g. 100×100 valves or more) can be difficult and expensive to construct to the necessary tolerances, and reliable addressing of specific valves to open or close on a millisecond time scale is often not feasible.

The present invention provides a novel bistable valve capable of being arranged in two dimensional valve arrays, with each valve in the array being controlled by passive matrix addressing. In a preferred embodiment, each valve includes a valve housing having an aperture plate defining an aperture therethrough, and an opposing plate positioned in spaced apart relationship to the aperture plate. A flexible electrically conductive film or strip is attached at its first end to the aperture plate and at its second end to the opposing plate. Valve action is provided by use of at least two switching electrodes for moving the flexible film between an aperture blocking position and an aperture open position, with at least one of the switching electrodes positioned adjacent to the aperture plate and at least one of the switching electrodes positioned adjacent to the opposing plate. To reduce unswitched movement when the switching electrode bias is reduced or not present, at least two catches are used. Generally, one of the catches is positioned adjacent to the aperture plate and at least one of the catches positioned adjacent to the opposing plate. These catches hold the film or strip in either a generally S-shaped aperture blocking or non-blocking position when switching forces are absent, but are insufficiently strong to prevent switching when the switching electrodes are activated.

The catches can be either mechanical, electrical, or even electromechanical. For example, an electrical catch can be provided by two catch electrodes, held at a constant catch voltage bias. If the catch voltage bias is substantially less than the switch voltage bias applied to the switching electrodes when moving the flexible film, the catches do not substantially interfere with switch action, yet still help maintain the flexible film in a constant position even when the switch voltage is no longer present. Advantageously, the provision of electrical catches minimizes migration or movement of the S-shaped flexure along the film in response to fluid forces. Similarly, mechanical catches that rely on lip structures, detents, or other suitable devices, alone or in combination with electrical catches, can result in an applied stress bias that holds the film in position with a small catch force. Again, this catch force is usually substantially less than the switching force applied when switching the film between a blocking and non-blocking position.

In preferred embodiments, various valve modifications can be employed to enhance valve operation, minimize power requirements, and increase valve switching times. For example, instead of a circular or elliptical aperture cross section, the aperture can be defined to have at least one acute vertex, providing a point release for air inflow or outflow. The flexible film does not have to be a straight, homogenous strip, but can be varied in composition, width, thickness, and stiffness along its length. For example, the flexible film can have a first narrow neck attachable to the aperture plate, a second narrow neck attachable to the opposing plate, and a wide body therebetween capable of assuming a generally S-shaped configuration. In other configurations, the flexible film can have a generally U-shaped configuration, with a first end attachable to the aperture plate and a second end attachable to the opposing plate. In still other configurations, electrode size, positioning, and geometry can be varied. For example, narrow electrodes can be provided adjacent to the narrow necks of the film, while electrodes can be widened where they are adjacent to the body of the film. These electrode modifications, and other mechanical modifications to the flexible film, allow for tuning valve response time, decreasing or increasing valve pressure strengths, and varying electrostatic interactions.

Advantageously, valves of the present invention can be arranged into large passively addressable arrays. Such arrays include a plurality of valves, with each valve defining an aperture therethrough, and a plurality of flexible films respectively attached to each of the plurality of valves, with each flexible film independently addressable to alternately switch between an aperture blocking position and an aperture open position. A switching voltage source is used to maintain a subset of the plurality of valves at either a non-switching voltage or a switching voltage. When switching electrodes are activated for applying an electrostatic switching force to move the plurality of flexible films, only that subset of the plurality of valves having flexible films maintained at the switch voltage switch between the aperture blocking position and an aperture open position. In practice, usually three address lines (with each address line having two possible voltages) connected to each valve in a valve array are required. Opposing switching electrodes are respectively addressed at one of two possible voltage (e.g. 100 volts and 0 volts, or 50 volts and −50 volts). To switch the film from a blocking to a non-blocking position, or vice versa, it is necessary to switch the voltages. When a particular valve in a two dimensional row and column array is to be switched, the voltage applied to all flexible strips in a particular row (or column) is changed from an intermediate voltage (e.g. 50 volts or 0 volts) to a switching voltage. Ordinarily, only that valve at the intersection of the row (or column) and column (or row) of opposing electrodes actually switches, with the others valves addressed in the array remaining unchanged. Of course, by appropriate row and column addressing, multiple switching in parallel is possible.

In a preferred embodiment, the use of independently addressable valves allows for high spatial precision transport of objects, including flexible objects such as paper. For certain applications, including processing of high purity or delicate materials, contamination or damage to the object may result from mechanical grasping or contact. This is particularly true for high speed processing systems, which may damage objects simply by engaging them. For example, high speed rollers may damage paper through differential engagement of misaligned paper with the roller, resulting in ripping or tearing of the paper. Fortunately, mechanical or frictional engagement is only one possible means for moving an object. Object drive mechanisms based on various fluid support techniques have long been employed to move delicate objects without requiring solid mechanical contact. For example, instead of using conventional belts, conveyors or rollers, paper moving through xerographic copier systems can be supported on a laminar air flow, or uplifted and moved by valve controlled air jets. This is particularly advantageous, for example, when sheets of paper carrying unfixed toner images must be moved between a photoconductive drum and a fusing station where the toner image is fixed. With conventional physical rollers, the continuing possibility of dynamic distortions to the toner image, or even slight misalignments resulting in image degradation, must always be considered.

Accordingly, the present invention provides a fluid transport apparatus and method for moving a flexible object that does not require physical contact. The present invention can effectively work with either continuous or discrete flexible objects moving through a materials processing system. A fluid pressure source is connected to a plurality of valves, with each valve defining an aperture therethrough, and having a plurality of flexible films respectively attached, with each flexible film independently addressable to alternately switch between an aperture blocking position and an aperture open position. A switching voltage source maintains a subset of the plurality of valves at one of a non-addressed voltage and an address voltage, and a plurality of switching electrodes apply an electrostatic switching force to move the plurality of flexible films, with only that subset of the plurality of valves having flexible films maintained at the address voltage switching between the aperture blocking position and an aperture open position.

Additional functions, objects, advantages, and features of the present invention will become apparent from consideration of the following description and drawings of preferred embodiments.

DETAILED DESCRIPTION OF THE INVENTION

Figure 1:
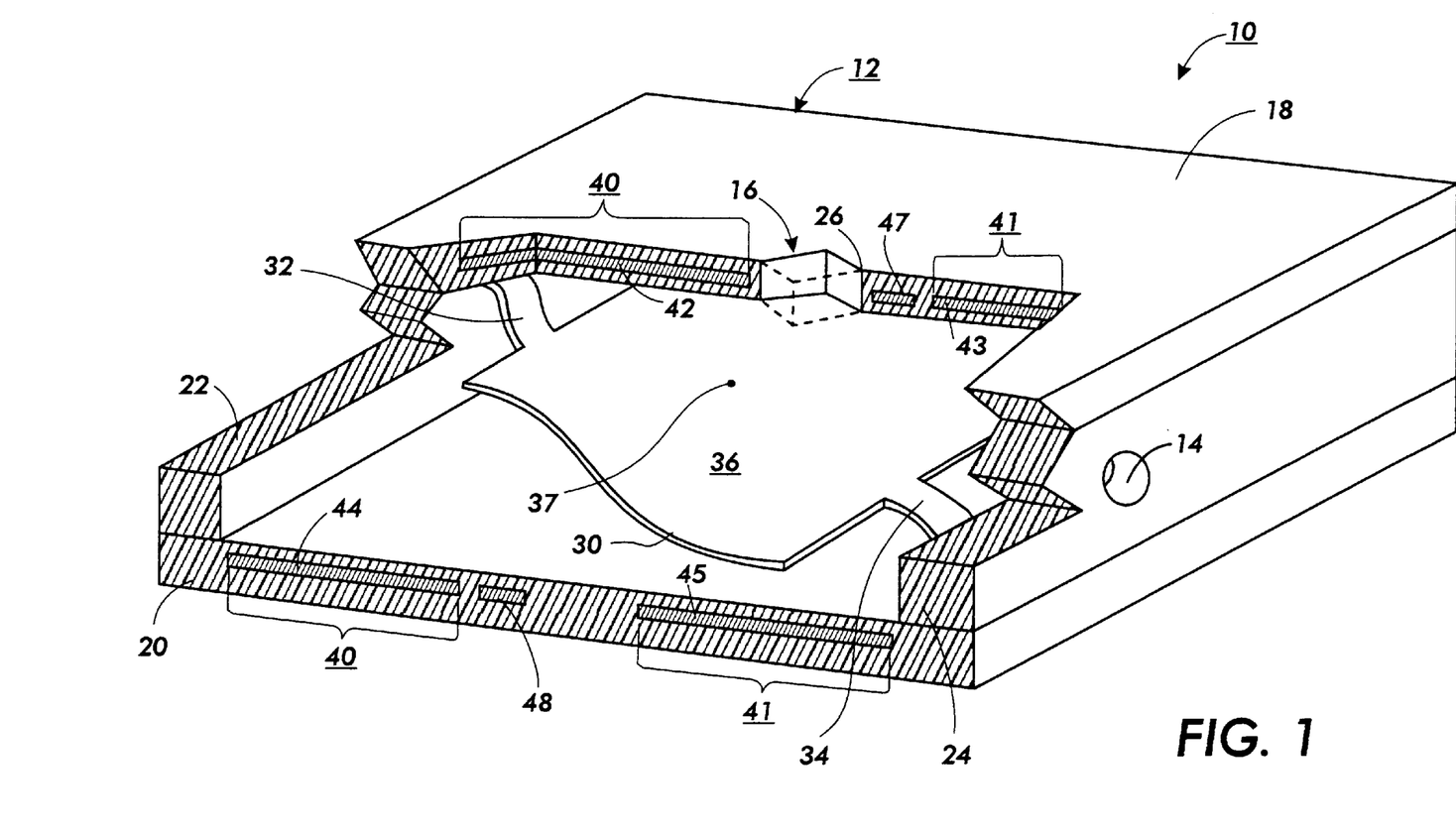
FIG. 1 illustrates a valve in accordance with the present invention in partially cut away perspective view, showing an S-shaped film moving from an aperture blocking position to a non-blocking position.

A valve 10 according to one embodiment of the present invention is illustrated in partially cut away perspective view in FIG. 1. The valve 10 includes a valve housing 12 that defines a port 14 and an aperture 16 with an acute vertex 26 for inlet or outlet of fluid. In the illustrated embodiment the port 14 is best configured as an inlet port for pressurized air, while the aperture 16 is a selectively blockable outlet. However, as those skilled in the art will appreciate, inlets and outlets can be reversed or repositioned as necessary for best operation.

The valve housing 12 is formed from an aperture plate 18 (defining the aperture 16), an opposing plate 20 positioned in spaced apart parallel relationship to the aperture plate 18, and spacers 22 and 24 positioned between the plates 18 and 20. In the illustrated embodiment, each of these structural elements (plates 18 and 20, spacers 22 and 24) are separately formed as distinct layers that are later bonded together, however, it is of course possible to use micromachining, plastic deposition, or other techniques to form unitary structures.

A flexible film 30 is sandwiched between the plates 18 and 20. As illustrated, the film 30 has a relatively wide body 36 and a pair of narrow necks 32 and 34. Neck 32 is pinned in position between plate 18 and spacer 22, while neck 34 is pinned between plate 20 and spacer 24. Because the combined length of the necks and body of the film is greater than the point to point distance between the pinned necks, in side view the body 36 is not straight, but instead forms a generally S-shaped curve. The center 37 of this S-curve is not fixed, but can move between a position near spacer 24, to a position near spacer 22. In the illustrated embodiment of FIG. 1, the center 37 of film 30 is about midway between spacers 22 and 24, in a position that does not block aperture 16.

To reliably switch the flexible film between an aperture 16 blocking position and an aperture non-blocking position, and vice-versa, requires use of electrodes 40 embedded in plates 18 and 20. The electrodes 40 can be divided into two classes, the first being switching electrodes 41 that pull the bulk of the body toward one or the other plates 18 and 20, and the second being catch electrodes 46 that hold the film 30 in position when the switching electrodes are not exerting strong electrostatic forces to attract the body 36 of the film 30 toward the plates. Electrodes 42 and 43 are switching electrodes embedded in the aperture plate 18, while electrodes 44 and 45 are switching electrodes embedded in the opposing plate 20. As will be appreciated, during switching the electrodes 42 and 43 will generally be activated through selective addressing at the same voltage, while electrodes 44 and 45 will be maintained at some voltage differential with respect to electrodes 42 and 43. The catch electrodes 46, consisting of electrode 47 in plate 18 and electrode 48 in plate 20, are typically smaller in area than the switch electrodes, and can be constantly maintained at some small voltage with respect to ground.

Valve 10 can be constructed with a variety of machining or micromachining techniques, including those associated with conventional integrated circuit or printed circuit board fabrication. For example, chemical etching, electron beam lithography, photolithography, or other standard integrated circuit batch processing technologies can be used to define necessary air conduits, control or circuitry conduits, holes, orifices, and apertures. Alternatively, injection molding, high precision numerically controlled machines, or stereolithography can be employed for low cost batch construction of valves. Materials used in construction may include plastics, metals, glasses, or ceramics. In one possible embodiment, plastics, epoxies, glass, silicon, polysilicon, silicon nitride, silicon, silicon oxide, oxynitride, plastics or aluminum, or any other available material suitable for lithographic processing can be used to define the necessary valve housing, valve structures, or conduits. Electrodes can be any conductive metal or polymer, while the flexible strip can be constructed from plastic films, aluminum coated mylar, plated nickel, or polyimide sandwiched aluminum. In typical applications, the housing of each valve will be less than 100 cubic millimeters in volume (10×10×1 millimeters), while the flexible strip in the valve housing will generally have dimension on the order of 0.1 to 10 millimeters in width, 0.5 to 50 millimeters in length, and 1 to 10 microns in thickness. Large arrays of the valves can be constructed, with meter scale arrays having tens of thousands of individual valves being contemplated.

Figure 2:
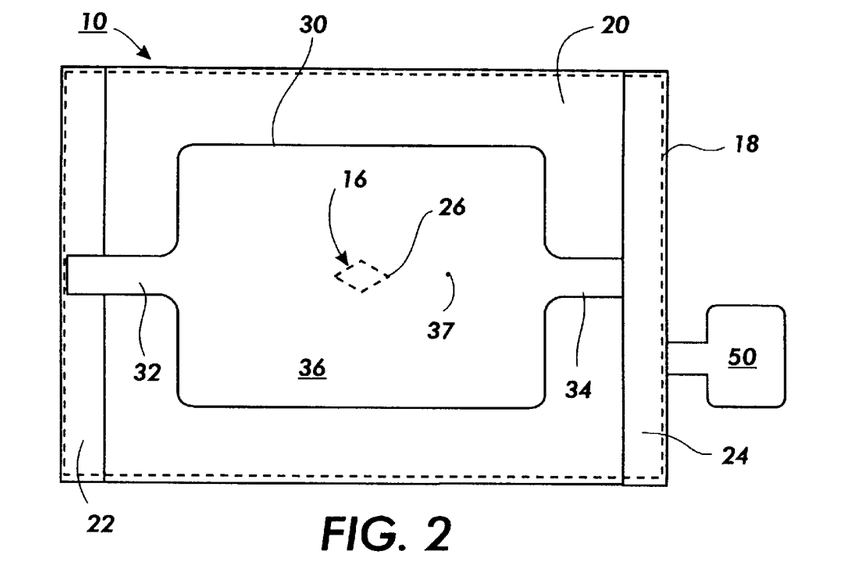
FIG. 2 is a top view of the valve of FIG. 1, with a top aperture plate removed to better illustrate positioning of the S-shaped film and the relative placement of the S-shaped film's dual neck and body.
Figure 3:
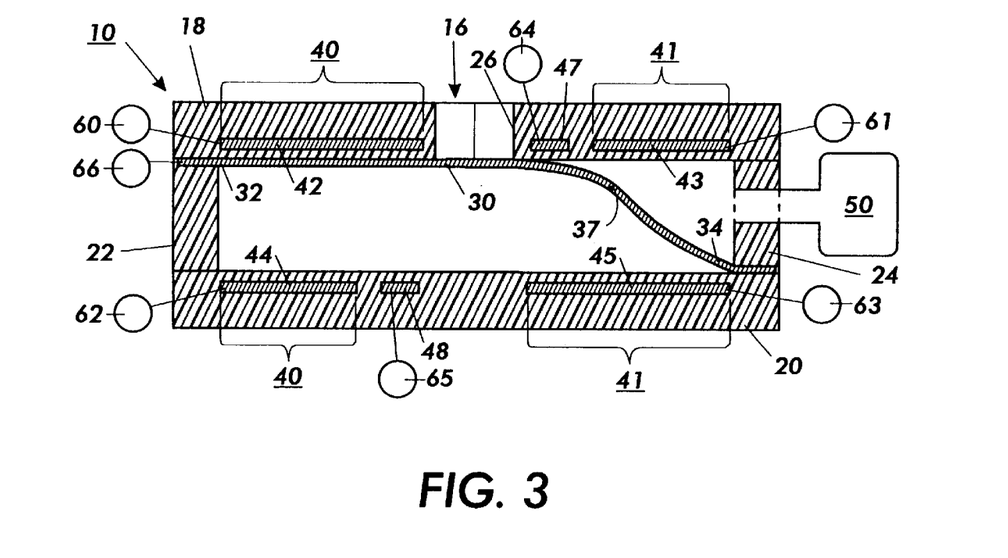
FIG. 3 is a side cross sectional view of the valve of FIG. 1 and 2, with the S-shaped film shown in an aperture blocking position.

Operation of valve 10 is best discussed in connection with FIGS. 2, 3, and 4. As seen in FIG. 2, a fluid pressure source 50 is connected to the valve. The fluid pressure source can be provided by a fan, vacuum source, pressurized air source, or any other conventional device suitable for modifying available fluid pressure. The fluid pressure source (typically filtered air) enters valve 10 and exits through aperture 16, unless aperture 16 is blocked by film 30, as seen in cross section in FIG. 3. Electrodes 42 and 43 are respectively connected to voltage sources 60 and 61, electrodes 44 and 45 are respectively connected to voltage sources 62 and 63, and the film 30 is connected to voltage source 66. In this unswitched view, voltage sources 60, 61, 62, 63, and 66 are substantially identical, with no significant voltage differentials. The film 30 is maintained in its blocking position in part by differential electrostatic attractive forces between the film 30 and the catch electrode 47, maintained at a small differential voltage with respect to the film 30 by a voltage source 64. This small voltage differential between the film 30 and the catch electrode 46 helps pin the S-curved film in position, and prevents movement of the center 37 of this S-curve between spacer 24 and spacer 22. Note that because of the relatively small voltages employed (typically less than 5–20 volt differentials with respect to film 30) and the substantial distance between the film 30 and the catch electrode 48, it is possible that voltage source 65 can constantly maintain a small voltage on catch electrode 48 without causing impairment of film 30 movement during switching.

Figure 4:
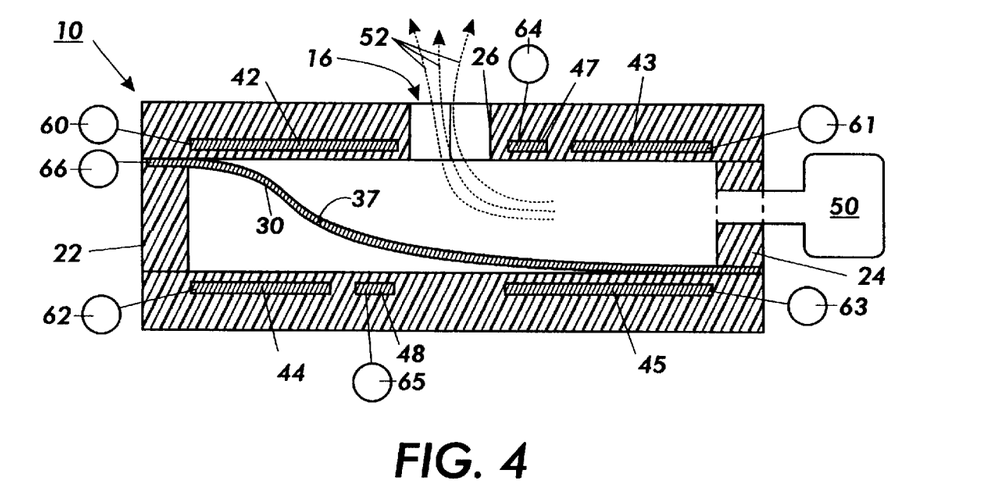
FIG. 4 is a side cross sectional view of the valve of FIG. 1 and 2, with the S-shaped film pulled down against an opposing plate by electrostatic interaction with electrodes into an aperture non-blocking position.

To unblock the aperture 16, as seen in FIG. 4, the switch electrodes and voltage source 66 connected to the film 30 are activated to provide a 17 substantial voltage differential (typically 25–150 volts, depending on valve dimensions and fluid pressure) between the film 30 and the switching electrodes 44 and 45 on the opposing plate 20. Electrostatic attraction induces the center 37 of the S-shaped film 30 to move away from spacer 24 toward the spacer 22. This movement is encouraged by the outflow 52 of pressurized fluid (air) through aperture 16, an outflow facilitated by the presence of the acute vertex 26 of aperture 16. As will be appreciated, even if a relatively small differential voltage is constantly maintained on catch electrode 47, it will not be sufficient to stop film movement given the substantial switching voltage differentials transiently present during switching. Upon completion of switching from a blocking to a non-blocking position, the valve 10 appears as seen in FIG. 4. Again, there is substantially no difference between voltage sources 60, 61, 62, 63, and 66. The film 30 is maintained in the non-blocking position in part by differential electrostatic attractive forces between the film 30 and the catch electrode 48, maintained at a small differential voltage with respect to the film 30 by a voltage source 65. This small voltage differential between the film 30 and the catch electrode 48 helps pin the S-curved film in position, and prevents movement of the center 37 of this S-curved film from its position near spacer 22 toward spacer 24.

Figure 5:
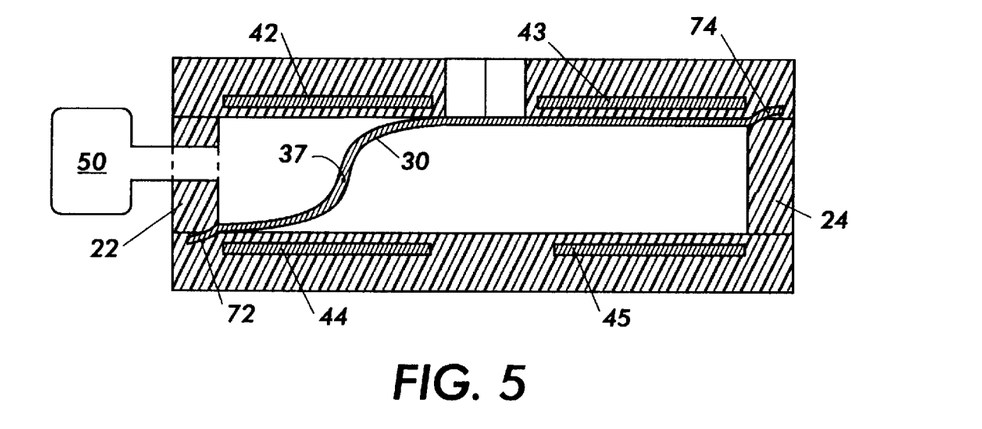
FIG. 5 is a side cross sectional view of a valve having a mechanical catch.

As will be appreciated, electrostatic catches are not required for operation of the present invention. As can be seen with reference to FIG. 5, it is also possible to substitute mechanical catches to hold a film in position when there is no substantial voltage differential between the switching electrodes and the film 30. In FIG. 5, the mechanical catches consist of curved lips 72 and 74 defined adjacent to spacers 22 and 24. These lips 72 and 74 have a small radius of curvature that creates stress bias in the film as it curves around the lips. Ordinarily, stress energy in the film is minimized when the center 37 of film 30 is adjacent to either one of spacer 22 or spacer 24 and the film is relatively straight. Substantial electrostatic forces must be applied to curve the film 30 around the lips 72 or 74 during switching. Because of this mechanical bistability, the film tends to stay in either the blocking or non-blocking position even absent catch electrodes as previously discussed.

Figure 6:
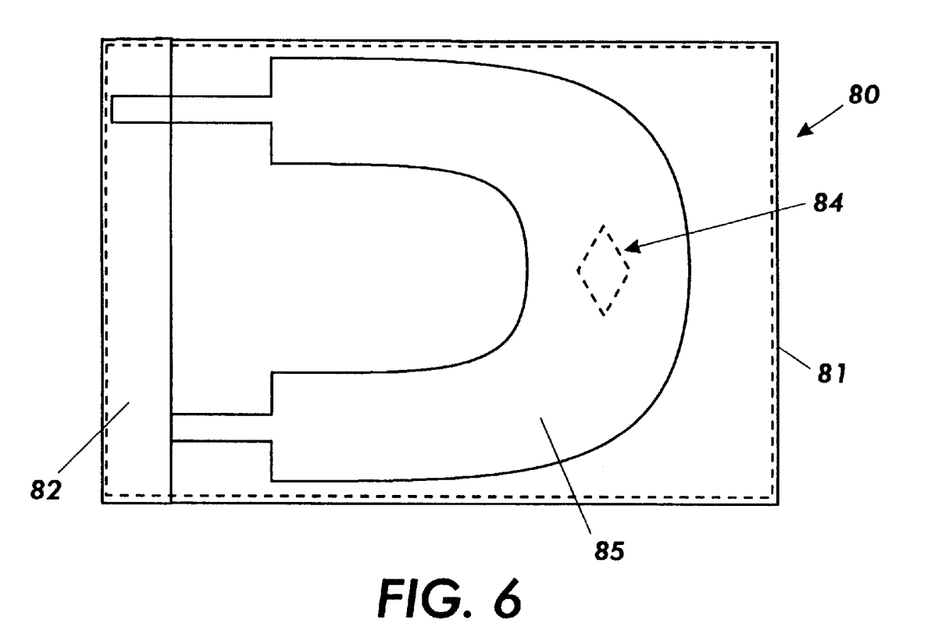
FIG. 6 is a top view of another valve embodiment having a generally U-shaped structure.
Figure 7:
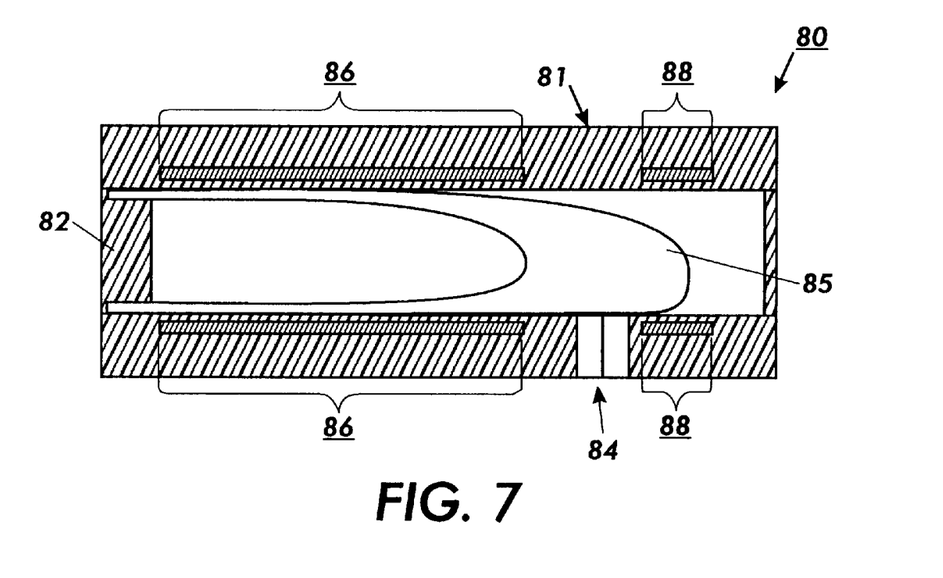
FIG. 7 is a side cross sectional view of the valve embodiment of the FIG. 6.

Alternative film structures and designs are also contemplated to be within the scope of the present invention. For example, FIGS. 6 and 7 illustrate a valve 80 having a U-shaped (horseshoe type) film 85 in a valve housing 81. The ends of the film 85 are vertically separated by a spacer 82 to allow formation of an S-curve in the film. An aperture 84 in the valve housing can be selectively blocked or unblocked by activation switching electrodes 86, and held in place after switching by catch electrodes 88.

Figure 8:
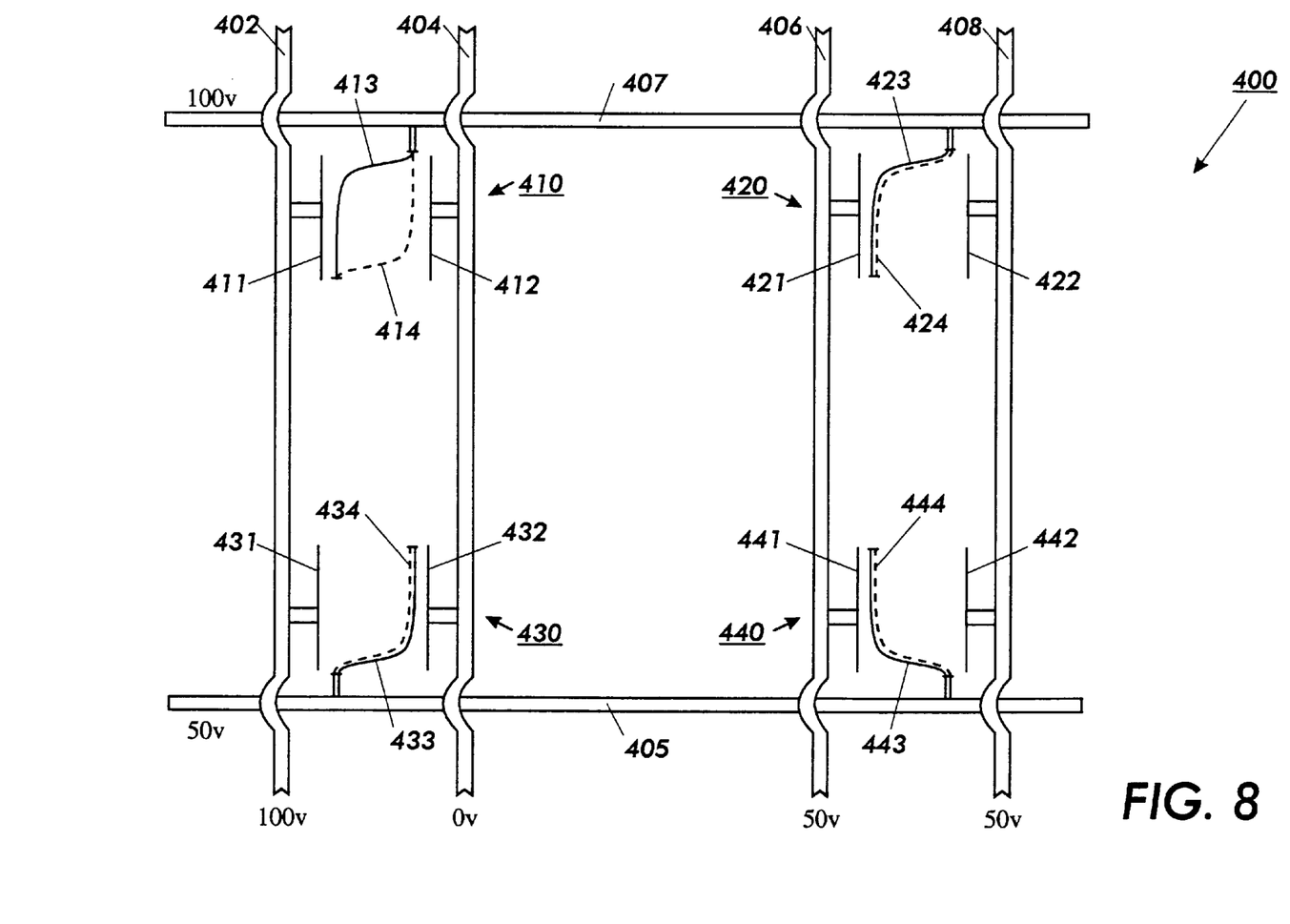
FIG. 8 is a schematic view illustrating voltage addressing of four valve sites, with one valve being switched while the remaining valves remain unswitched.

Switching operation through passive matrix addressing of arrays of valves having structures in accordance with the foregoing embodiments of the invention can best be seen with reference to FIG. 8. A four valve array 400 is schematically illustrated in FIG. 8, with four S-curve film valves 410, 420, 430, and 440 being controlled by voltage address lines. Each valve has identical structure, with a first electrode plate (electrode plate 411, 421, 431, or 441) separated from a second electrode plate (electrode plate 412, 422, 432, or 442). An S-curve film in a start position before switching (film 413, 423, 433, or 443) is indicated in solid line, while the after switching position is indicated by dotted outline (film 414, 424, 434, 444). Address line 402 is connected to plates 411 and 431, address line 404 is connected to plates 412 and 432, address line 404 is connected to plates 421 and 441, and address line 406 is connected to plates 422 and 442. In addition, address line 407 is connected to S-curve films 413 and 423, while address line 405 is connected to S-curve films 433 and 443.

FIG. 8 illustrates the procedure for switching valve 410 while leaving the remaining valves 420, 430, and 440 unswitched. Normally, all address lines are maintained at the same voltage (in this case 50 volts), so there is no voltage differential between the movable film and the plates that would induce switching between blocking and non-blocking positions, or between non-blocking and blocking positions. To switch valve 410, voltage in address line 410 is raised from 50 volts to 100 volts, voltage in address line 402 is also raised from 50 volts to 100 volts, and voltage in address line 408 is dropped from 50 volts to 0 volts. This leaves the final position 444 of the film unchanged in valve 440, since there is no voltage change at all, with all address lines remaining at 50 volts. The final position 424 of the film in valve 420 is also unchanged. Even though the film voltage has been raised to 100 volts from its previous 50 volts, the voltage differential between the plates 421 and 422 and the film is still only 50 volts, not enough of a differential to induce electrostatic switching since the voltage differential is below the switching threshold. Similarly, valve 430 remains unswitched, since the voltage differential between the plates 431 and 432 and the film is only 50 volts. However, the specifically addressed valve 410 will switch. In valve 410 the new voltage differential is 100 volts, enough to cause switching of the film from proximity to plate 411 to proximity to plate 412 in a new position 414. As those skilled in the art will appreciate, various alternative voltage levels are possible, as long as the voltage differential is adequate for switching. Note that this illustrative example can be extended to allow for passive matrix addressing of arbitrary valve elements in large valve arrays by simple voltage addressing.

Valve arrays controlling pressurized air jets as taught with respect to FIG. 8 can be used for handling objects, including flexible objects such as paper. For example, a processing system 110 optimized for handling objects without requiring direct physical contact, including sheets of paper 112, is partially illustrated in FIG. 9. The processing system 110 has a conveyor 120, divided into a lower section 122 and a upper section 124. For clarity, the upper section 124 is cut away to better illustrate paper movement, however, it will be appreciated that the upper section 124 and lower section 122 are substantially coextensive. The sections 122 and 124 are maintained in spaced apart relationship to define a passage 123 therebetween, with the passage sized to accommodate non-contacting passage therethrough of paper 112. Each section 122 and 124 has a plurality of independently or semi-independently controlled adjustable air jets 126 for dynamically supporting, moving, and guiding paper 12 through the system 10. At least some of these air jets 126 are controlled by valves in accordance with present invention, as exemplified with reference to those valve embodiments in FIGS. 1–8.

Figure 9:
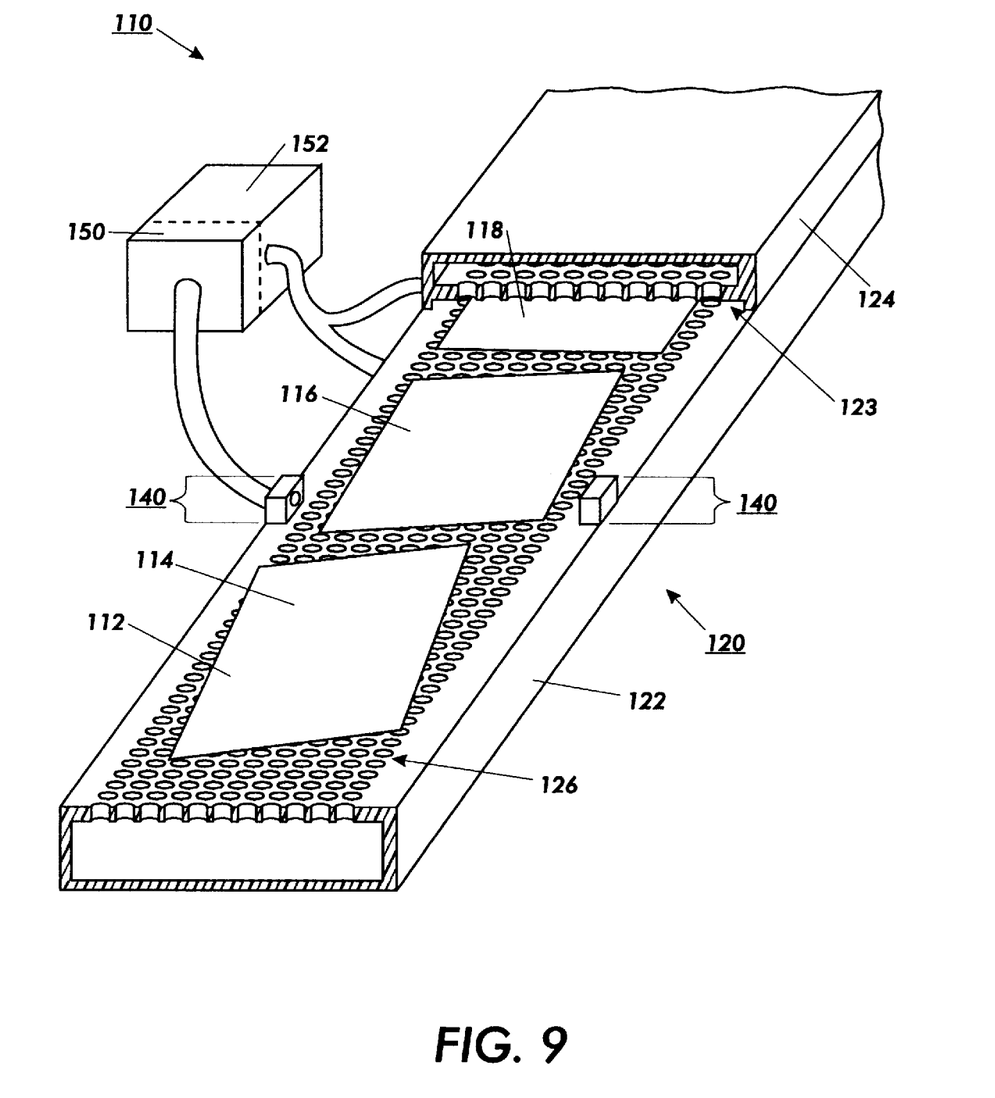
FIG. 9 illustrates a paper handling system for accurately moving air jet supported papers at high speeds using an array of valves in accordance with the present invention, with sensor units used to detect a paper, and a movement control unit connected to the sensor units to provide appropriate corrective input to air jets to maintain the paper on a desired path, velocity, and orientation.

Having opposed air jets in sections 122 and 124 permits adjustable application of air flow (by the directed air jets) to opposing sides of paper 112, dynamically holding the paper between sections 122 and 124, while allowing precise control of paper position, velocity, and orientation through application of vertical, lateral, or longitudinal forces (again by directed air jets). As an added advantage, the use of independent or semi-independent controlled adjustable air jets 126 allows for dynamically increasing or decreasing air flow directed against portions of paper 112, allowing straightening, flattening, curling, decurling, or other desired modification in paper topography, as well as adjustments to paper position, orientation and velocity. In addition, paper of various weights, sizes, and mechanical characteristics can be easily supported and accelerated by appropriate modification of the air flow applied by air jets 126. For example, a heavy, thick, and relatively inflexible cardboard type paper may require more air flow from the jets 126 for support and maneuvering, while a lightweight paper sheet may require less overall air flow, but may need quicker and more frequent air flow adjustments directed by the independent or semi-independent air jets 126 to compensate for flutter or edge curling effects.

Active flexible object guidance (of paper 112) to correct for flutter and other dynamic problems of flexible objects is enabled by provision of at least one sensing unit 140. The sensing unit 140 senses the motion state of paper 112, giving spatial and dynamic information (such as may be yielded from application of an optical imaging system or edge detection system) to a motion analysis unit 150 capable of calculating relative or absolute movement of paper 112 from the received information, with movement calculations generally providing overall position, orientation, velocity of paper 112, as well as position, orientation, and velocity of subregions of the paper 112 (due to flexure of the paper 112). Typically, the motion analysis unit 150 is a general purpose computer or dedicated hardware system capable of high speed image processing calculations necessary for determining object movement. Using this calculated movement information, a motion control unit 152 connected to the motion analysis unit 150 sends control signals to conveyor 120 to appropriately modify movement of paper 112 by selectively increasing or decreasing application of directed air jets to subregions of the paper 112 to reduce flutter, buckling, curling, or other undesired deviations from the desired motion state. As will be appreciated, use of discrete sensors, motion analysis units, and motion control units is not required, with integrated motion analysis and motion control assemblies being contemplated. In fact, it is even possible to provide a plurality of integrated sensors, motion analysis units, and motion control units as integrated microcontroller assemblies on the conveyor.

Whether the sensing unit 140 is discrete or integrated with microcontrollers, in order to ascertain object position properly the sensing unit 140 must be reliable and accurate, having a spatial and temporal resolution sufficient for tracking a relatively small area of the flexible object (typically at least about one square centimeter, although greater or lesser resolution is of course possible). Further, in many processes the object is moving quickly, allowing less than a 100 milliseconds for tracking measurements. Fortunately, optical sensors, video imaging systems, infrared or optical edge detectors, or certain other conventional detectors are capable of providing suitable spatial and temporal resolutions. For best results, two dimensional optical sensors (such as charge coupled devices (CCD's)), scanned one dimensional arrays, or continuous position sensitive detectors are utilized. However, fixed one dimensional sensor arrays can also be used. As will also be appreciated, contactless sensors other than optical sensors may be used, including but not limited to pressure sensors, acoustic sensors, or electrostatic sensors.

In operation, use of a sensing unit 140 for feedback control of object movement allows for precise micromanipulation of object motion state. For an illustrative example, in FIG. 9 paper 112 is sequentially illustrated in three distinct positions along conveyor 120, respectively labeled as paper position 114, paper position 116, and paper position 118. In position 114, the paper 112 arriving at the conveyor 120 is misaligned. As paper 112 is moved along conveyor 120 toward position 116 by air jets 126, the sensor 140 provides a time series of discrete spatial measurements that correspond to the instantaneous position of paper 112. These elements of a time series of spatial measurement information are continuously passed to the motion analysis unit 150. The motion analysis unit 150 uses the received information (i.e. the sensor measured one, two, or three dimensional spatial information) to accurately determine motion state of paper 112, including its position, velocity, and dynamics. This information (which may be collectively termed "trajectory") is passed to the motion control unit 152, which computes a corrective response to minimize error in trajectory and sends signals to selected air jets 126 to correct the misalignment, bringing the paper 112 closer to alignment as indicated by position 116. This feedback control process for properly orienting paper 112 by feedback controlled corrections to paper trajectory (the paper 112 now spatially located at position 116) is repeated, with the trajectory of paper 112 finally being correctly aligned as shown at position 118. As will be appreciated, this feedback control process for modifying the trajectory of flexible objects can be quickly repeated, with millisecond cycle times feasible if fast sensor, motion processing, and air jet systems are employed.

Advantageously, the present invention allows for manipulation and control of a wide variety of flexible objects and processes. In addition to paper handling, other flexible articles of manufacture, including extruded plastics, metallic foils, wires, fabrics, or even optical fibers can be moved in accurate three dimensional alignment. As will be appreciated, modifications in layout of conveyor 120 are contemplated, including but not limited to use of curved conveyors (with curvature either in a process direction or perpendicular to the process direction to allow for vertical or horizontal "switchbacks" or turns), use of cylindrical or other non-linear conveyors, or even use of segmented conveyors separated by regions that do not support air jets. In addition, it may be possible to construct the conveyer 120 from flexible materials, from modular components, or as interlocking segmented portions to allow for quick and convenient layout of the conveyor in a desired materials processing path.

The present invention permits ready detection and correction of trajectory, rotations, slight misalignments, three dimensional misalignments due to flutter, creases, edge turning, or other orientation problems that can be difficult to quickly detect and provide suitable movement compensation using standard material processing movement control systems. As will be appreciated by those skilled in the art, proper air jet construction and control is a critical aspect of the present invention. Typically, air jets must be constructed and positioned with respect to a flexible object to enable application of on the order of one millinewton of force to each side of the flexible object, with precise force values of course depending on material and dynamic properties of the flexible object, along with the desired object acceleration and trajectory. For best operation, the exerted air jet forces must be quickly changeable. For example, a typical 0.025 cm diameter orifice having a length of about 0.1 centimeter would be expected to have an intrinsic response time for air movement on the order of 100 microseconds. Of course valve response times, controllers, motion analysis, and pressure conditions must also be such that air jet operation and control occurs on a millisecond time scale.

Figure 10:
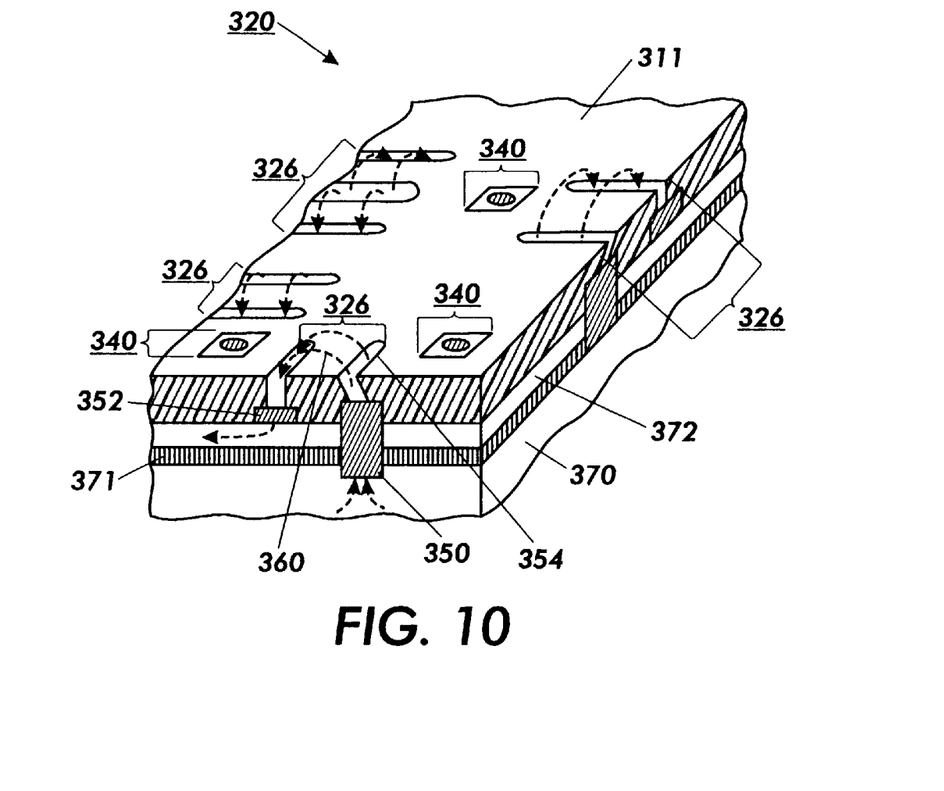
FIGS. 10 is an exemplary illustration of a directed air jet system having valve controlled vertical, lateral, and longitudinal air jets, along with integrated sensor systems to enable accurate feedback controlled positioning of flexible objects in three dimensions.

A generic air jet architecture suitable for use in the present invention is illustrated with reference to FIG. 10. A portion of a flexible object conveyor 320 includes a variety of air jets 326 for enabling longitudinal, lateral, and vertical transport of flexible objects (flexible objects not shown for clarity). The air jets 326 include channels 354 defined in the conveyor surface 311 to allow exit or entrance of flowing air 360. For example, a single S-curve film type valve 350 (part of a two dimensional array of valves) in accordance with the present invention can be selectively operated by passive matrix addressing to permit high pressure air in plenum 370 to flow upward, impart momentum to flexible objects, and pass downward through valve 352 and into plenum 372. As shown in FIG. 10, plenum 372 is separated from plenum 370 by partition 371, with plenum 372 being maintained at a lower air pressure than plenum 370.

Control of flexible object path is enabled by provision of a plurality of integrated sensors 340, which can include, but are not limited to, optical, mechanical, thermal, electrostatic, or acoustic sensors. The sensors 340 are used to provide near continuous sensor feedback relating to object position, which in turn allows nearly continuous movement control of flexible objects passing adjacent to the air jets 326. As will be appreciated, information received from sensors 340 can be passed to a centralized motion analysis unit and motion control unit, such as described in connection with FIG. 9. Alternatively, distributed or local motion analysis and control can be employed. For example, sensors 340 can be integrated with computer microcircuitry capable of analyzing sensor input and directing control of air jets.

Figure 11:
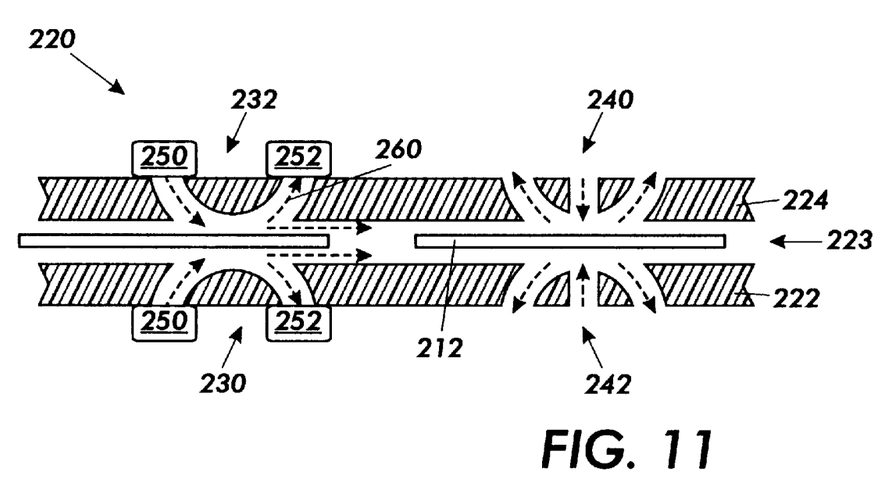
FIGS. 11 is a cross section of a directed air system similar to that illustrated in FIG. 10, illustrating directed air flow patterns.

FIG. 11 is a side view of a flexible object conveyor 220 that is divided into a lower section 222 and a upper section 224, with a passage 223 therebetween, and each section 222 and 224 having a plurality of independently or semi-independently controlled adjustable air jets 26 for dynamically supporting, moving, and guiding paper 212 through the system. As previously explained in connection with FIG. 9, having opposed air jets in sections 222 and 224 permits adjustable application of air flow (by the directed air jets) to opposing sides of paper 212, dynamically holding the paper between sections 222 and 224, while allowing precise control of paper position, velocity, and orientation through application of vertical, lateral, or longitudinal forces (again by directed air jets). For example, longitudinal transport of paper 212 is encouraged by the combined action of air jets 230 and 232, positioned to oppose each other in respective sections 222 and 224. Air flow 260 is controlled by valves 250 and 252, with the air flow imparting longitudinally directed momentum to paper 212. As another example of controlling position of paper 212, opposed air jets 240 and 242 can be used to vertically direct air 260 to suspend paper 212 in a desired position in conveyor 220. This capability can even be extended to allow differential lateral or longitudinal tensioning of subregions of a piece of paper, permitting decurling, curling, reduction of flutter, or other desirable paper shaping effects.

While the present invention has been described in conjunction with specific embodiments thereof, it is evident that many alternatives, modifications, and variations will be apparent to those skilled in the art. Accordingly, the various embodiments described herein should be considered illustrative, and not limiting the scope of the present invention as defined in the following claims.

What is claimed is:

1. A valve comprising
    a valve housing having an aperture plate defining an aperture therethrough, and an opposing plate positioned in spaced apart relationship to the aperture plate,
    a flexible film attached at a first end to the aperture plate and at a second end to the opposing plate,
    at least two switching electrodes for moving the flexible film between an aperture blocking position and an aperture open position, with at least one of the switching electrodes positioned adjacent to the aperture plate and at least one of the switching electrodes positioned adjacent to the opposing plate, and at least two catches for reducing unswitched movement of the flexible film, with at least one of the catches positioned adjacent to the aperture plate and at least one of the catches positioned adjacent to the opposing plate.

2. The valve of claim 1, wherein the at least two catches further comprise at least two catch electrodes, with a catch voltage bias maintained on the at least two catches being less than a switch voltage bias applied to the at least two switching electrodes when moving the flexible film.

3. The valve of claim 2, wherein the catch voltage bias is constant.

4. The valve of claim 1, wherein the at least two catches further comprise at least two mechanical catches, with force required to overcome the mechanical catches being less than switching force exerted against the film when a switch voltage bias is applied to the at least two switching electrodes.

5. The valve of claim 1, wherein the aperture is defined to have at least one acute vertex.

6. The valve of claim 1, wherein the width of the flexible film varies along its length.

7. The valve of claim 6, wherein the flexible film has a first narrow neck attachable to the aperture plate, a second narrow neck attachable to the opposing plate, and a wide body therebetween capable of assuming a generally S-shaped configuration.

8. The valve of claim 1, wherein the flexible film has a generally U-shaped configuration, with a first end attachable to the aperture plate and a second end attachable to the opposing plate.

9. A valve comprising a valve defining an aperture therethrough, a flexible film attached to the valve to alternately switch between an aperture blocking position and an aperture open position, a switching electrode for applying an electrostatic switching force to move the flexible film between the aperture blocking position and an aperture open position, and a catch for reducing unswitched movement of the flexible film in both the aperture blocking position and the aperture open position, the catch maintaining a catch force less than the electrostatic switching force applied by the switching electrode.

10. A passively addressable array of valves comprising a plurality of valves, with each valve defining an aperture therethrough, a plurality of flexible films respectively attached to each of the plurality of valves, with each flexible film independently addressable to alternately switch between an aperture blocking position and an aperture open position, a switching voltage source for maintaining a subset of the plurality of valves at one of a non-addressed voltage and an address voltage, a plurality of switching electrodes for applying an electrostatic switching force to move the plurality of flexible films, with only that subset of the plurality of valves having flexible films maintained at the address voltage switching between the aperture blocking position and an aperture open position.

11. The passively addressable array of valves of claim 10, further comprising a plurality of catches, with at least one catch in each of the plurality of valves for reducing unswitched movement of the flexible films in both their aperture blocking position and their aperture open position, the catches maintaining a catch force less than the electrostatic switching force applied by the switching electrodes when the flexible films are maintained at their address voltage.

12. The passively addressable array of valves of claim 11, wherein each catch in each of the plurality of valves further comprises at least two catch electrodes, with a catch voltage bias maintained on the at least two catch electrodes being less than an electrostatic switch voltage bias applied to the switching electrodes when moving the flexible film.

13. The valve of claim 12, wherein the catch voltage bias maintained on the at least two catch electrodes is constant.

14. The valve of claim 11, wherein each catch in each of the plurality of valves further comprises at least two mechanical catches, with force required to overcome the mechanical catches being less than the switching force exerted against the film when the electrostatic switch voltage bias is applied switching electrodes.

15. A valve controlled fluid transport system for moving an object, the system comprising a fluid pressure source, a plurality of valves, with each valve defining an aperture therethrough, and having a plurality of flexible films respectively attached, with each flexible film independently addressable to alternately switch between an aperture blocking position and an aperture open position, a switching voltage source for maintaining a subset of the plurality of valves at one of a non-addressed voltage and an address voltage, a plurality of switching electrodes for applying an electrostatic switching force to move the plurality of flexible films, with only that subset of the plurality of valves having flexible films maintained at the address voltage switching between the aperture blocking position and an aperture open position.

16. The fluid transport system of claim 15, further comprising a plurality of sensors for detecting object motion.

* * * * *

UNITED STATES PATENT AND TRADEMARK OFFICE
CERTIFICATE OF CORRECTION

PATENT NO. : 5,897,097
APPLICATION NO. : 08/711299
DATED : April 27, 1999
INVENTOR(S) : David K Biegelsen et al.

It is certified that error appears in the above-identified patent and that said Letters Patent is hereby corrected as shown below:

Column 1, line 3, insert as a new paragraph:

This invention was made with Government support under DABT63-95-C-0025 awarded by ARPA. The Government has certain rights in this invention.

Signed and Sealed this

Eleventh Day of March, 2008

JON W. DUDAS
*Director of the United States Patent and Trademark Office*